Patented Nov. 24, 1953

2,660,526

UNITED STATES PATENT OFFICE 2,660,526

DIAZOTYPE REFLEX PHOTOPRINTING

Clifford E. Herrick, Jr., Easton, Pa., assignor to General Aniline & Film Corporation, New York, N. Y., a corporation of Delaware No Drawing. Application January 3, 1949, Serial No. 69,059

22 Claims. (Cl. 95—8)

This invention relates to diazotype reflex photoprinting.

In reflex photoprinting, a translucent or transparent light sensitive photographic sheet is placed over an original to be copied having areas of contrasting reflecting power (e. g. a printed page or a line drawing), and exposed to illumination through the translucent sheet, so that contrasting exposures are obtained corresponding to the contrasting areas on the original, by reason of the differential illumination provided by the light reflected from the original to which the photographic sheet is exposed in addition to the incoming light.

When a simple photographic foil is employed, uniform illumination thereof by the incoming rays greatly reduces the available contrast of illumination as compared with photographic processes in which uniform illumination does not traverse the photo-sensitive material. Thus, the ratio of maximum to minimum illumination of various portions of the photographic material will necessarily be less than 2:1, since the incoming light is diminished prior to reflection by the light absorption of the foil and the light absorption of the original. Accordingly, to produce useful reflex images, photographic material of high transparency and of high sensitometric contrast should be used. However, in the case of diazotype light sensitive layers and materials containing them, it has been found that sensitizing components of relatively high transparency are inherently characterized by low sensitometric contrast, and hence, it has not proven experimentally possible to provide suitable diazotype reflex photoprinting materials for making copies by uniform illumination. Moreover, since high transparency of the light sensitive material corresponds to low light absorption, and since only the absorbed light is effective in producing the photographic effect, diazotype materials of high transparency would necessarily have a relatively low printing speed.

It has been proposed to improve diazotype reflex copying processes by illuminating the light sensitive material overlying an original to be reproduced with sub-divided illumination, i. e., illumination of high and low intensity on adjacent minute areas, especially by first passing the light through a screen before it traverses the copying material. The light sensitive material under the screen openings is thus completely burned out, while those portions which are masked by the screen are subjected mainly to diffuse light reflected from the surface of the original, thus yielding contrasts in illumination more nearly corresponding to the contrasts in reflecting power of the various portions of the original. However, by sub-dividing the illumination in the aforesaid manner, a considerable loss in printing speed results. Moreover, when screened illumination is used, a moiré effect is produced when it is attempted to reproduce a half-tone original. In order to obtain maximum contrast in exposure of the areas masked by the screen by the diffused light reflected from the original, it is necessary to space the screen and the light sensitive layer from the original by distances depending mainly on the spacing and the proportionate area of the screen openings. For obtaining acceptable results, this spacing is critical, often requiring special apparatus to provide proper exposure for the reflex material to produce a reflex image.

It is an object of this invention to provide a process for reflex photoprinting and materials therefor which employ uniform illumination, but which produce increased contrasts as compared with diazotype reflex processes employing uniform illumination in the prior art, whereby many of the difficulties attendant upon such prior art processes as well as screen reflex processes are avoided.

I have discovered that the aforesaid difficulties can be avoided or reduced in diazotype reflex photoprinting by superposing on the original to be copied, diazotype photoprinting material containing an oriented dichroic light sensitive diazo compound, and exposing the photoprinting material to illumination with plane polarized light of which the transmission axis (i. e., the axis for maximum transmission) is disposed parallel to the transmission axis of the dichroic light sensitive diazo compound in the photoprinting material. By reason of the fact that a photographic effect (i. e., in this case, decomposition of the diazo compound) is produced only by absorbed light, the incoming polarized light traversing the reflex photoprinting material produces a minimum exposure of the light sensitive layer. However, upon reflection by the surface of the original to be copied, the polarized light becomes depolarized, thus acquiring a component of oscillation perpendicular to its original plane of polarization, and disposed for maximum absorption, and hence, maximum photographic exposure of the superposed layer of light sensitive dichroic diazo compound in the reflex photoprinting material. In this way, an important improvement in exposure contrast results as compared with previously proposed reflex processes involving uniform illumination through the light sensitive material with ordinary light. Moreover, as compared with screen reflex processes, the entire surface of the original is available for reflection of light so that the speed of exposure is considerably increased. When a half-tone original is employed, no moiré effect is produced, and no problem exists of providing critical spacing between the original and the light sensitive layer or any other element employed in the photoprinting process.

The production of translucent diazotype photoprinting materials containing an oriented dichroic light sensitive diazo compound can be conveniently effected in a manner similar to that employed in making light polarizing films or foils. Thus, translucent or transparent films of linear polymer material such as polyvinyl alcohol, can be converted to a highly oriented state in which the polymer chains are disposed substantially in parallelism, by stretching a non-oriented film of such a polymer in a linear direction to several times its original length under such conditions that the stretch remains permanent. Such films, when stained with a dichroic material such as a polyiodide or dyestuffs such as certain of the direct cotton colors, readily transmit light of which the vector of oscillation is in one plane, and absorb light of which the vector of oscillation is perpendicular to said plane. Thus, the film becomes a polarizing filter for light transmitted thereby. Incorporation of a stain in a film can be effected either before or after subjecting the film to the stretching treatment in order to provide polarizing materials of the aforesaid types.

By employing as a stain a dichroic light sensitive diazo compound, the resulting film constitutes a highly effective reflex diazotype photoprinting material for use with polarized light. Suitable dichroic light sensitive diazo compounds for the aforesaid purpose are especially the monodiazo compounds of the p,p'-diamino-biphenyl series. Similar compounds of related structure such as monodiazo compounds of the p,p'-diaminostilbene series are also effective as dichroic light sensitive materials. These compounds, when incorporated as a stain in a film of an oriented linear polymer such as stretched polyvinyl alcohol film, apparently become oriented with their principal molecular axes parallel to the direction of stretch or polymer orientation, and show maximum absorption for light of which the vector of oscillation is parallel to the direction of said orientation, and minimum absorption or maximum transmission for light of which the vector of oscillation is perpendicular to the direction of the principal molecular axes.

Thus, when a substantially non-diffusing oriented film of polyvinyl alcohol stained with a dichroic light sensitive diazo compound of the aforesaid type is superposed on an original such as a printed paper sheet or a line drawing, of which the background areas are adapted to depolarize light (such surfaces as paper, a ground glass surface, a diffusing plastic film etc.) and the film is exposed to illumination with plane polarized light of which the vector of oscillation is perpendicular to the direction of the stretched film (i. e., so as to afford maximum transmission through the film), the light transmitted by the film when depolarized and reflected by the original, provides light modulated in intensity in accordance with the reflecting power of the various areas on the original, and having a component parallel to the orientation of the dichroic diazo compound in the film, and hence, subject to maximum absorption by the diazo compound. Upon such absorption, the light sensitive diazo compound is decomposed in accordance with the reflecting power of the various portions of the original, thus producing a latent image which can be developed by usual methods involving coupling the residual diazo compound with an azo coupling component. In practice, the development can be effected conveniently in the case of the aforesaid class of dichroic light sensitive compounds by treating the film with an alkaline developing solution containing an azo coupling component, e. g. an aqueous alcoholic sodium bicarbonate solution containing azo coupling components such as H-acid, γ-acid, resorcinol, 1-phenyl-3-methyl-5-pyrazolone, or acetoacetanilide.

The polarized light employed for the exposure of the reflex diazotype materials of this invention can be conveniently provided by passing ordinary light through a polarizing filter such as a film of stretched polyvinyl alcohol containing a dichroic stain of the type well known in the art. If desired, the polarizing film can be laminated to the light sensitive dichroic diazotype film, such that the polarizing axis of the filter material is parallel to the axis of maximum transmission of the diazotype film. Since the light sensitive dichroic diazo compounds ordinarily show maximum dichroism for light of limited wavelength range, it is advantageous to use a light source for the exposure yielding light of a wavelength within the aforesaid range, or to interpose a color filter having maximum transmission for light of the aforesaid wavelength between the light source and the light sensitive material. A filter layer of this type can also be laminated together with the light polarizing filter and the light sensitive film.

After exposure and development, the polarizing filter layer and, if desired, the color filter, are advantageously removed or rendered ineffective as by discharging or bleaching the polarizing stain and the color filter material so as to permit transmission of ordinary light, especially when the reflex print is used as a transition copy for making additional photographic copies by light transmitted through the reflex print. In most cases the azo dye image which is formed by coupling the oriented diazo with a suitable coupler, is likewise oriented in the same direction as the diazo. In this event, it is advantageous to overlay the reflex foil containing the oriented dye with a polarizing filter whose transmission axis lies at right angles to the transmission axis of the dye image.

My invention is illustrated by a number of preferred embodiments described in the following examples, wherein parts are by weight.

*Example 1*

2.57 parts of benzidine dihydrochloride were dissolved in 100 parts of water and a solution of 0.7 part of sodium nitrite in 10 parts of water was added with agitation. After stirring the mixture for about 5 minutes, the mixture was filtered, yielding a filtrate containing monodiazo benzidine in the form of its hydrochloride, i. e. 4-amino-biphenyl - 4 - diazonium chloride. A sheet of 3.2 mil polyvinyl alcohol film was sensitized by dipping it in the filtrate for a short time and the excess liquid removed by wiping with a suitable absorbent, and the partly dried material then stretched about five times its original length in a linear direction with gentle heating (for example, at about 20–70° C.). After drying thoroughly in stretched condition, the stretch became permanent, and the resulting foil was placed in contact with the surface of an original to be reproduced. A polarizing filter (e. g. a Polaroid H-filter) was superposed on the light sensitive foil with its transmission axis perpendicular to the direction of stretch (i. e., parallel to the maximum transmission axis) of the sensitized foil. The resulting layers were exposed to light in a diazotype photoprinting machine through the polarizing filter and the light sensitive foil. After exposure, the light sensitive foil was developed by immersion in a solution of sodium bicarbonate and an azo coupling component in a solvent consisting of a mixture of equal amounts of methanol and water. Azo coupling components employed were H-acid, γ-acid, 1-phenyl-3-methyl-5-pyrazolone, resorcinol and acetoacetanilide, yielding, respectively, magenta, purple, yellow, yellowish-pink, and yellow images.

Instead of preparing the sensitizing solution as described above, a similar sensitizing solution can be advantageously prepared by tetrazotizing 1.28 parts of benzidine dihydrochloride dissolved in 100 parts of water containing 0.55 part of HCl, by cooling to 0° C. and adding a solution of 0.69 part of sodium nitrite in 10 parts of water. A solution of 0.92 part of benzidine and 0.183 part of HCl in 100 parts of cold 6N. aqueous acetic acid are added to the tetrazotized benzidine solution, and after stirring for 30 minutes at 0° C., the mixture is diluted to the desired concentration with water and held at 0–10° C. for several days. The resulting solution can be employed in the same manner as the sensitizing solution described above for incorporation in an oriented polyvinyl alcohol film.

Instead of applying the azo coupling component to the exposed reflex diazotype foil in a developing solution, the coupling component can be incorporated together with the light sensitive diazo compound in the polyvinyl alcohol foil, providing the mixture is suitably buffered to prevent premature coupling as well as fading during development of the sensitizing composition. Thus, it has been found that by including one of the aforesaid couplers together with mono-diazotized benzidine in an oriented polyvinyl alcohol film, and further including ammonium chloride as a buffer and stabilizer in the sensitizing solution, the reflex material can be developed after exposure to light while superposed on an original, by treatment with an alkaline vapor such as ammonia.

Optimum dichroism and sensitivity is obtained with reflex materials containing mono-diazotized benzidine as described in this example when green to yellow light is employed having its predominant wavelength within the range of 500–600 millimicrons. Accordingly, optimum results are obtained by using light within this wavelength range for the image producing exposure of the material of this example, for example, by interposing a color filter between a source of ordinary light and the light sensitive material, said filter having maximum transmission for light of a wavelength within the aforesaid range.

*Example 2*

N,N-diethyl-benzidine, prepared by reacting p-diethylamino-benzene diazonium chloride zinc chloride double salt with an excess of nitrobenzene in acetic anhydride containing 4% sodium acetate at 25° C., stripping off unreacted nitrobenzene by vacuum distillation, neutralizing the residue, extracting with ether, and reducing the extracted p-diethylamino-p'-nitrodiphenyl with hydrogen in the presence of a Pd catalyst in ethanol, was diazotized in the same manner as the benzidine employed in the foregoing example, whereby a purple diazotype sensitizing solution was obtained. Polyvinyl alcohol foil similar to that employed in Example 1 was stained with the sensitizing solution, stretched, dried, placed upon an original to be copied and exposed to plane polarized light as described in the preceding example. Substantially colorless burn-out areas were formed by such exposure, and upon development by treatment with an azo coupling component solution of the same type used in Example 1, a satisfactory reflex print was obtained. Optimum sensitivity and dichroism of the light sensitive film produced in this example is obtained when green light having a predominant wavelength within the range of 540–560 millimicrons is used for the image-forming exposure. Accordingly, light of this wavelength range is preferably employed for making the reflex copies.

In the foregoing example, similar results were obtained when the diazo compound of 4'-amino-4-dimethylaminostilbene was used as the light sensitive diazo compound instead of diazotized 4'-amino-4-diethylaminobiphenyl. The aforesaid diazotized stilbene compound yields light sensitive material having a gray-blue coloration and having optimum sensitivity and dichroism to red light of a predominant wavelength between 600 and 680 millimicrons.

*Example 3* p,p'-Diaminostilbene-disulfonic acid is diazotized in aqueous solution by reaction with an alkali metal nitrite under mildly acid conditions (at a pH of 3–5), yielding a solution containing mainly the mono-diazotized derivative of p,p'-diaminostilbene-disulfonic acid. Polyvinyl alcohol foil is impregnated with the resulting solution, and stretched to about five times its original length, as described in Example 1, to effect molecular orientation of the dichroic light sensitive diazo compound. After drying, the film is placed upon an original to be reproduced, and exposed to plane polarized light vibrating in a direction for maximum transmission by the light sensitive foil. Upon development by treatment with an alkaline solution of one of the coupling components of Example 1, a positive image of the original is produced in the foil.

Instead of the light sensitive diazo compound of the foregoing examples, other dichroic light sensitive diazo compounds can be used, especially other mono-diazotized derivatives of the benzidine and p,p'-diaminostilbene series. Such light sensitive dichroic mono-diazotized compounds can be readily prepared by diazotizing unsymmetrical N-alkyl substituted derivatives of benzidine and of p,p'-diaminostilbene.

While the incorporation of the aforesaid dichroic light sensitive diazo compounds in polyvinyl alcohol films can be carried out prior to orientation of the film, film can be cast from a polyvinyl alcohol solution containing the dichroic light sensitive diazo compound. This procedure is sometimes advantageous when the diazo compound does not readily enter the oriented film. For example, the polyvinyl alcohol can be dissolved in hot water to form a solution having a concentration of 15%, and after addition of the dichroic light sensitive diazo compound, the solution is spread with a doctor blade on a glass surface. Upon stretching the film, for example, at 60° C., the light sensitive material is found to be molecularly oriented as in the case of the stretched films of the examples.

Still another method for incorporating the dichroic light sensitive diazo compound in an oriented film involves incorporating the corresponding amine or salt thereof in the foil and diazotizing in situ to form the light sensitive dichroic diazo compound. Orientation can be effected before or after diazotization by stretching the film or by casting the film from a solution as hereinbefore indicated. This method is especially adapted for incorporating relatively difficultly soluble dichroic diazo compounds in the film, particularly when available solutions of the diazo compound have insufficient concentration to produce an adequate density of the diazo compound in the film.

Instead of polyvinyl alcohol, other linear polymers yielding linearly oriented films, e. g. by stretching or by suitable methods of formation involving extrusion, spreading with a doctor blade in linear direction, and the like, can be used for making the dichroic reflex diazotype materials of this invention. Preferably, hydrophilic polymers are used such as polyvinyl acetal or regenerated cellulose. The oriented film should be substantially non-diffusing in order to avoid appreciable depolarization.

The dichroic diazotype foils of this invention can be laminated, if desired, to a translucent backing such as a translucent sheet of paper. A suitable adhesive for this purpose is a solution of polyvinyl alcohol in water. The paper can be transparentized after lamination by applying a suitable varnish or other film-forming impregnant. Similarly, the dichroic diazotype foils can be laminated to a polarizing foil having its axis of maximum transmission substantially parallel to that of the dichroic light sensitive diazo compound of the light sensitive foil. When a polarizing filter as well as a paper backing are used, the filter layer is preferably interposed between the paper backing and the dichroic light sensitive foil. A convenient method of preparing dichroic diazotype reflex materials of this invention including an integral light polarizing filter involves impregnating one surface of an oriented (stretched) polyvinyl alcohol film with a neutral polarizing stain, and after laminating the stained surface with aqueous polyvinyl alcohol to a paper backing, the opposite surface is sensitized by impregnation with a solution of one of the dichroic diazo compounds hereinbefore mentioned. The light sensitive diazo compound becomes oriented in the film so that its axis of maximum transmission coincides with that of the polarizing filter. The paper is transparentized, yielding a combined polarizing dichroic reflex diazotype material adapted for the production of reflex copies by placing its light sensitive surface against the surface of an original, and illuminating the assembly through the paper and the intermediate polarizing layer with ordinary light or preferably light of the optimum wavelength for dichroic sensitivity of the diazo compound. In order to produce additional copies by using the reflex print as a transition copy, the polarizing stain is advantageously removed or nullified by suitable treatment, e. g. by treatment with ammonia, washing out, etc.

The image-forming coloration in the diazotype materials produced in accordance with this invention generally retains light polarizing properties. Thus, when the reflex materials are used as transition copies for the production of additional copies by ordinary (e. g. contact photographic) processes, increased contrasts are generally obtained by employing polarized light for the exposure in which the direction of vibration is adjusted for maximum absorption by the dichroic image coloration of the reflex transition copy, e. g. the direction of vibration of such polarized light being ordinarily perpendicular to that of the polarized light employed during the exposure for making the reflex transition copy itself.

In addition to the dichroic light sensitive diazo compounds described above, other light sensitive dichroic compositions, which yield an image of differential light transmitting power upon differential exposure to light either directly or upon subsequent development, can be used in oriented films, such as polyvinyl alcohol, to form a dichroic layer, which can be employed for making reflex copies by the procedure described above for dichroic photoprinting materials. Suitable compounds for this purpose include the poorly light fast azo dichroic dyes such as Congo red or Stilbene yellow and dichroic compounds such as methylene blue or thionine which are light sensitive in the presence of an optical sensitizer such as allyl thiourea.

Variations and modifications which will be obvious to those skilled in the art can be made in the processes and details hereinbefore described without departing from the spirit or scope of the invention.

I claim:

1. A process for the production of reflex copies which comprises placing a translucent sheet of photoprinting material upon the surface of an original to be copied having a light-depolarizing surface with areas of differential reflecting power, said photoprinting material having a substantially non-diffusing light sensitive layer containing a dichroic light sensitive composition molecularly oriented in a linear direction; passing polarized light of a wavelength range toward which said light-sensitive composition exhibits dichroism, through said layer onto the original, said light vibrating in a direction for substantially maximum transmission through the dichroic layer; and developing the image formed by differential exposure of the light sensitive composition.

2. A process for the production of diazotype reflex copies which comprises placing a translucent sheet of diazotype photoprinting material upon the surface of an original to be copied having a light-depolarizing surface with areas of differential reflecting power, said diazotype material having a substantially non-diffusing light sensitive layer containing a dichroic light sensitive diazo compound molecularly oriented in a linear direction; passing polarized light of a wavelength range toward which said light-sensitive diazo compound exhibits dichroism, through said layer onto the original, said light vibrating in a direction for substantially maximum transmission through the dichroic diazo compound layer; and developing the image formed by differential exposure of the light sensitive composition.

3. A process for the production of diazotype reflex copies which comprises placing a translucent sheet of diazotype photoprinting material upon the surface of an original to be copied having a light-depolarizing surface with areas of differential reflecting power, said diazotype material having a substantially non-diffusing light sensitive layer containing a dichroic light sensitive diazo compound molecularly oriented in a linear direction; passing light of a wavelength range toward which said light-sensitive diazo compound exhibits dichroism, through a polarizing filter disposed to have its axis of maximum transmission substantially parallel to the axis of maximum transmission of said dichroic diazo compound layer, and then through said layer onto the original; and developing the image formed by differential decomposition of the light sensitive diazo compound.

4. A process for the production of diazotype reflex copies which comprises placing a translucent sheet of diazotype photoprinting material upon the surface of an original to be copied having a light-depolarizing surface with areas of differential reflecting power, said diazotype material having a light sensitive layer containing a dichroic light sensitive diazo compound molecularly oriented in a linear direction, and a light polarizing filter layer disposed to intercept light directed through the photoprinting material toward said original before it passes through the light sensitive layer, the polarizing filter layer and the light sensitive layer being disposed to have their axes of maximum transmission substantially parallel; passing light of a wavelength range toward which said light-sensitive diazo compound exhibits dichroism, through said photoprinting material onto the original; developing the image formed by differential decomposition of the light sensitive diazo compound; and neutralizing the polarizing power of the filter layer.

5. A process for the production of diazotype reflex copies which comprises placing a translucent sheet of diazotype photoprinting material upon the surface of an original to be copied having a light-depolarizing surface with areas of differential reflecting power, said diazotype material having a light sensitive layer containing a dichroic light sensitive diazo compound molecularly oriented in a linear direction and yielding burn-out areas translucent to actinic light upon exposure to light and subsequent development; passing polarized light of a wavelength range toward which said light-sensitive diazo compound exhibits dichroism, through said sheet onto the original, said light vibrating in a direction for substantially maximum transmission through the dichroic diazo compound layer; developing the image formed by differential decomposition of the light sensitive diazo compound to form a transition copy; exposing photoprinting material to polarized light through said transition copy, the light vibrating perpendicular to the axis of maximum transmission of the light sensitive layer of the transition copy; and developing the image formed thereby in the last-named photoprinting material.

6. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polymeric material impregnated with a dichroic light sensitive diazo compound molecularly oriented in a linear direction; passing polarized light of a wavelength range toward which said light-sensitive diazo compound exhibits dichroism, through said sheet onto the original, said light vibrating in a direction for substantially maximum transmission through the dichroic diazo compound layer; and coupling the residual light sensitive diazo compound with an azo coupling component to develop a reflex image.

7. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented hydrophilic polymeric material impregnated with a water-soluble dichroic light sensitive diazo compound molecularly oriented in a linear direction; passing polarized light of a wavelength range toward which said light-sensitive diazo compound exhibits dichroism through said sheet onto the original, said light vibrating in a direction for substantially maximum transmission through the dichroic diazo compound layer; and coupling the residual light sensitive diazo compound with an azo coupling component in aqueous solution to develop a reflex image.

8. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polymeric material impregnated with a dichloric light sensitive diazo compound molecularly oriented in a linear direction, and containing an azo coupling component and a stabilizer for preventing premature decomposition and coupling of the light sensitive diazo compound; passing polarized light of a wavelength range toward which said light-sensitive diazo compound exhibits dichroism, through said sheet onto the original, said light vibrating in a direction for substantially maximum transmission through the dichroic diazo compound layer; and exposing the sheet to an alkaline vapor to effect coupling of the residual light sensitive diazo compound with the azo coupling component to develop a reflex image.

9. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polyvinyl alcohol impregnated with a dichroic light sensitive mono-diazotized p,p'-diamine of the class consisting of p,p'-diamines of the biphenyl and stilbene series, said light sensitive diazo compound being molecularly oriented in a linear direction; passing polarized light of a wavelength range toward which said light-sensitive diazo compound exhibits dichroism, through said sheet onto the original, said light vibrating in a direction for substantially maximum transmission through the dichroic diazo compound layer; and coupling the residual light sensitive diazo compound with an azo coupling component to develop a reflex image.

10. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polyvinyl alcohol impregnated with dichroic light sensitive mono-diazotized benzidine molecularly oriented in a linear direction; passing polarized light of predominant wavelength range of 500 to 600 millimicrons through said sheet onto the original, said light vibrating in a direction for substantially maximum transmission through the dichroic diazo compound layer; and coupling the residual light sensitive diazo compound with an azo coupling component to develop a reflex image.

11. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polyvinyl alcohol impregnated with dichroic light sensitive mono-diazotized N,N-diethyl-benzidine molecularly oriented in a linear direction; passing polarized light of predominant wavelength range of 540 to 560 millimicrons through said sheet onto the original, said light vibrating in a direction for substantially maximum transmission through the dichroic diazo compound layer; and coupling the residual light sensitive diazo compound with an azo coupling component to develop a reflex image.

12. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polyvinyl alcohol impregnated with dichroic light sensitive mono-diazotized N,N-dimethyl-p,p'-diamino stilbene molecularly oriented in a linear direction; passing polarized light of predominant wavelength range of 600 to 680 millimicrons through said sheet onto the original, said light vibrating in a direction for substantially maximum transmission through the dichroic diazo compound layer; and coupling the residual light sensitive diazo compound with an azo coupling component to develop a reflex image.

13. Reflex diazotype photoprinting material comprising translucent sheet material including a light sensitive layer containing a dichroic light sensitive diazo compound molecularly oriented in a linear direction, said diazo compound being a mono-diazotized p,p'-diamine of the class consisting of p,p'-diamines of the biphenyl and stilbene series.

14. Reflex diazotype photoprinting material comprising translucent sheet material including a layer of linearly oriented hydrophilic polymeric material impregnated with a water-soluble dichroic light sensitive diazo compound capable of coupling with an azo coupling component, said diazo compound being molecularly oriented in a linear direction in the polymer layer and being a mono-diazotized p,p'-diamine of the class consisting of p,p'-diamines of the biphenyl and stilbene series.

15. Reflex diazotype photoprinting material comprising translucent sheet material including a light sensitive layer containing a dichroic light sensitive diazo compound molecularly oriented in a linear direction, said diazo compound being a mono-diazotized p,p'-diamine of the class consisting of p,p'-diamines of the biphenyl and stilbene series, and a light polarizing filter layer having its axis of maximum transmission substantially parallel to that of the light sensitive diazo compound layer.

16. Reflex diazotype photoprinting material comprising translucent sheet material including a layer of linearly oriented polyvinyl alcohol impregnated with a mono-diazotized p,p'-diamine of the class consisting of p,p'-diamines of the biphenyl and stilbene series, said light sensitive diazo compound being molecularly oriented in a linear direction in the polymer layer.

17. Reflex diazotype photoprinting material, comprising translucent sheet material including as a light sensitive layer, a layer of linearly oriented polyvinyl alcohol impregnated with light sensitive dichroic diazotized N,N-diethyl-benzidine.

18. Reflex diazotype photoprinting material, comprising translucent sheet material including as a light sensitive layer, a layer of linearly oriented polyvinyl alcohol impregnated with light sensitive dichroic diazotized N,N-dimethyl-p,p'-diaminostilbene.

19. Reflex diazotype photoprinting material, comprising translucent sheet material including as a light sensitive layer, a layer of linearly oriented polyvinyl alcohol impregnated with light sensitive dichroic mono-diazotized benzidine, and including a polarizing filter layer having its axis of maximum transmission substantially parallel to that of the mono-diazotized benzidine layer.

20. A process for the production of diazotype reflex copies which comprises placing a translucent sheet of diazotype photoprinting material upon the surface of an original to be copied having a light-depolarizing surface with areas of differential reflecting power, said diazotype material having as a light sensitive layer, a layer of linearly oriented polyvinyl alcohol impregnated with dichroic light sensitive mono-diazotized p,p'-diaminostilbene-disulfonic acid molecularly oriented in a linear direction; passing polarized light of a wavelength range toward which said light-sensitive diazo compound exhibits dichroism through said sheet onto the original, said light vibrating in a direction for substantially maximum transmission through the dichroic diazo compound layer; and coupling the residual light sensitive diazo compound with an azo coupling component to develop a reflex image.

21. Reflex diazotype photoprinting material, comprising translucent sheet material including as a light sensitive layer, a layer of linearly oriented polyvinyl alcohol impregnated with light sensitive dichroic mono-diazotized p,p'-diaminostilbene-disulfonic acid.

22. Reflex diazotype photoprinting material comprising translucent sheet material including a light-sensitive layer containing a dichroic light-sensitive diazo compound molecularly oriented in a linear direction, a light-polarizing filter having its axis of maximum transmission substantially parallel to that of the dichroic light-sensitive diazo compound in the layer, and a color filter layer disposed to intercept light passing through said light-polarizing filter having maximum transmission for a wavelength range toward which said light-sensitive layer exhibits maximum dichroism.

CLIFFORD E. HERRICK, Jr.

References Cited in the file of this patent

UNITED STATES PATENTS

| Number | Name | Date |
| --- | --- | --- |
| 1,436,125 | Ullmann | Nov. 21, 1922 |
| 1,563,045 | Schaffer | Nov. 24, 1925 |
| 1,971,966 | Sakurai | Aug. 28, 1934 |
| 2,114,468 | Van der Grinten | Apr. 19, 1938 |
| 2,204,604 | Land | June 18, 1940 |
| 2,245,628 | Poser et al. | June 17, 1941 |
| 2,246,425 | Poser et al. | June 17, 1941 |
| 2,289,714 | Land | July 14, 1942 |
| 2,299,906 | Land | Oct. 27, 1942 |
| 2,316,644 | Yule | Apr. 13, 1943 |
| 2,365,416 | Kuhne | Dec. 19, 1944 |
| 2,432,549 | Von Glahn | Dec. 16, 1947 |
| 2,432,593 | Straley | Dec. 16, 1947 |

OTHER REFERENCES

The Photographic Journal, March 1939 (vol. LXXIX, pages 121–131).

The Photographic Journal, July 1936 (vol. 60, pages 395–406).

Diserens, The Chemical Technology of Dyeing and Printing, vol. I (1948), published by Reinhold Publishing Corp., New York 18, N. Y., pages 394, 400, 401.